United States Patent
Oblizajek et al.

(10) Patent No.: US 10,183,696 B2
(45) Date of Patent: Jan. 22, 2019

(54) METHODS AND SYSTEMS FOR CONTROLLING STEERING SYSTEMS OF VEHICLES

(71) Applicant: GM GLOBAL TECHNOLOGY OPERATIONS LLC, Detroit, MI (US)

(72) Inventors: Kenneth L. Oblizajek, Troy, MI (US); Stephen R. Pastor, Farmington Hills, MI (US); David M. Caldwell, Roseville, MI (US); John D. Sopoci, Commerce Township, MI (US)

(73) Assignee: GM Global Technology Operations LLC MI (US)

( * ) Notice: Subject to any disclaimer, the term of this patent is extended or adjusted under 35 U.S.C. 154(b) by 408 days.

(21) Appl. No.: 14/844,964

(22) Filed: Sep. 3, 2015

(65) Prior Publication Data
US 2015/0375785 A1 Dec. 31, 2015

Related U.S. Application Data

(63) Continuation of application No. 13/747,048, filed on Jan. 22, 2013, now Pat. No. 9,150,245.

(51) Int. Cl.
| | |
|---|---|
| *B62D 13/02* | (2006.01) |
| *B62D 15/02* | (2006.01) |
| *B62D 6/00* | (2006.01) |
| *G01S 19/13* | (2010.01) |

(52) U.S. Cl.
CPC ............ *B62D 15/025* (2013.01); *B62D 6/00* (2013.01); *G01S 19/13* (2013.01)

(58) Field of Classification Search
CPC ...... B62D 6/04; B62D 5/0835; B62D 5/0463; B62D 5/0472; B61L 15/0027; B61L 15/0036
See application file for complete search history.

(56) References Cited

U.S. PATENT DOCUMENTS

| | | | | |
|---|---|---|---|---|
| 7,346,995 | B2 * | 3/2008 | Olson | G01C 17/38 33/356 |
| 7,364,006 | B2 * | 4/2008 | Birsching | B62D 5/0835 180/421 |
| 7,725,227 | B2 * | 5/2010 | Pattok | B62D 6/04 180/443 |
| 2004/0236596 | A1 * | 11/2004 | Chowdhary | G06Q 30/0601 705/26.1 |
| 2005/0182542 | A1 * | 8/2005 | Kwasny | B62D 15/0245 701/41 |
| 2006/0249326 | A1 * | 11/2006 | Birsching | B62D 5/0835 180/422 |

(Continued)

FOREIGN PATENT DOCUMENTS

KR    20060032465 A  *  4/2006  ............. G01C 21/28

*Primary Examiner* — Redhwan K Mawari
(74) *Attorney, Agent, or Firm* — Lorenz & Kopf, LLP (57) ABSTRACT

Methods and systems are provided for controlling a steering system of a vehicle is provided. A detection unit is configured to obtain a compass heading, a global positioning system (GPS) heading, or both. A processor is coupled to the detection unit, and is configured to determine whether a vehicle is on a straight line path using the compass heading, the GPS heading, or both, and to selectively implement a feature of the steering system based on whether it is determined that the vehicle is not on a straight line path.

20 Claims, 3 Drawing Sheets

(56) References Cited

U.S. PATENT DOCUMENTS

| | | | | |
|---|---|---|---|---|
| 2006/0253234 A1* | 11/2006 | Kane | ............... | B61L 3/008 |
| | | | | 701/19 |
| 2008/0147276 A1* | 6/2008 | Pattok | ............... | B62D 5/0472 |
| | | | | 701/42 |
| 2010/0332125 A1* | 12/2010 | Tan | ............... | G01C 21/165 |
| | | | | 701/408 |
| 2011/0022270 A1* | 1/2011 | Tamaizumi | ............... | B62D 5/0463 |
| | | | | 701/41 |
| 2011/0178671 A1* | 7/2011 | Bae | ............... | G01B 21/26 |
| | | | | 701/31.4 |

\* cited by examiner

METHODS AND SYSTEMS FOR CONTROLLING STEERING SYSTEMS OF VEHICLES

CROSS-REFERENCE TO RELATED APPLICATIONS

This is a continuation of, and claims priority from, U.S. application Ser. No. 13/747,048, filed on Jan. 22, 2013, the entirety of which is hereby incorporated by reference herein.

TECHNICAL FIELD

The present disclosure generally relates to vehicles, and more particularly relates to methods and systems for controlling steering systems of vehicles.

BACKGROUND

Certain vehicles today have EPS (Electric Power Steering) systems that provide torque compensation when either short term or long term conditions may otherwise result in an off-center pull of the steering wheel. Such torque compensation for steering may be desirable in situations in which the vehicle regularly leads or pulls in a direction that is not intended by the driver (a lead/pull condition), and which would require the driver to apply torque to the steering wheel even if the vehicle was travelling along a straight line path on a smooth, flat, and non-inclined road.

Torque-reducing EPS steering systems of vehicles may not always provide optimal torque compensation, for example in distinguishing between straight-line driving as compared with operation on a relatively long-radius turn (such as a freeway ramp).

Accordingly, it is desirable to provide an improved method for controlling steering systems of vehicles, for example, by employing improved discrimination between straight-line driving as compared with operation on a relatively long-radius turn (such as a freeway ramp). It is also desirable to provide an improved system for controlling steering systems, as well as to provide improved vehicles that include such methods and/or systems. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method of controlling a steering system of a vehicle is provided. The method comprises determining whether the vehicle is on a straight line path based on a compass heading, a global positioning system (GPS) heading, or both, and selectively implementing a feature of the steering system based on whether it is determined that the vehicle is on a straight line path.

In accordance with another exemplary embodiment, a system for controlling a steering system of a vehicle is provided. The system comprises a detection unit and a processor. The detection unit is configured to obtain a compass heading, a global positioning system (GPS) heading, or both. The processor is coupled to the detection unit, and is configured to determine whether a vehicle is on a straight line path using compass heading, the GPS heading, or both, and to selectively implement a feature of the steering system based on whether it is determined that the vehicle is on a straight line path. In accordance with a further exemplary embodiment, a vehicle is provided. The vehicle comprises a drive system, and electric power steering system, and a control system. The electric power steering system is coupled to the drive system. The control system is coupled to the electric power system. The control system comprises a detection unit and a processor. The detection unit is configured to obtain a compass heading, a global positioning system (GPS) heading, or both. The processor is coupled to the detection unit and configured to determine whether a vehicle is on a straight line path using the compass heading, the GPS heading, or both, and selectively implement a feature of the steering system based on whether it is determined that the vehicle is on a straight line path.

DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
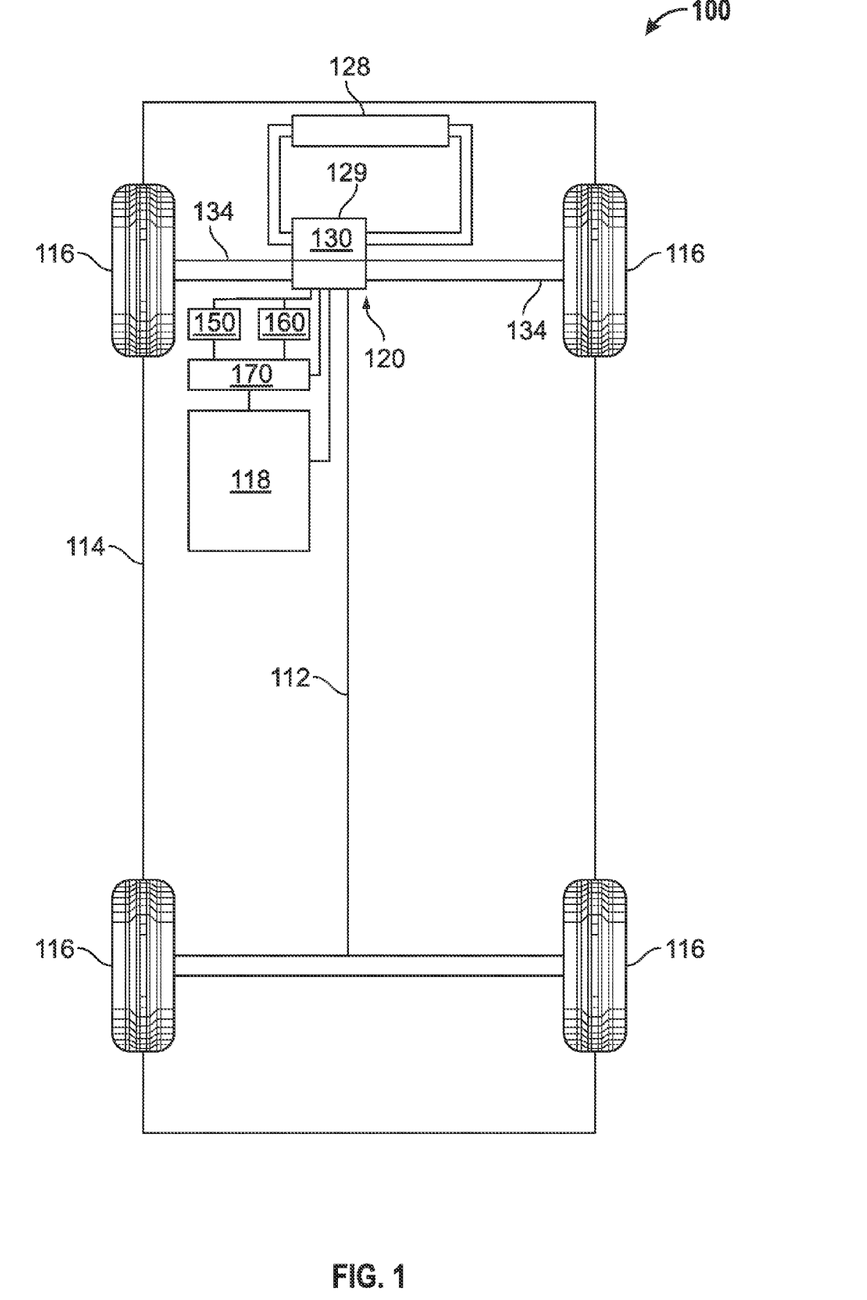
FIG. 1 is a functional block diagram of a vehicle that includes, among other features, an electric power steering system, and a control system for controlling the electric power steering system, in accordance with an exemplary embodiment.

FIG. 1 illustrates a vehicle 100, or automobile, according to an exemplary embodiment. The vehicle 100 is also referenced at various points throughout this Application as the host vehicle. As described in greater detail further below, the vehicle 100 includes an electric power steering system (EPS) (also referred to herein as a steering system) and a control system that controls the steering functionality using, among other factors, discrimination between straight-line driving and vehicle turns, including vehicle turns with relatively long radii (such as a freeway ramp).

As depicted in FIG. 1, the vehicle 100 includes a chassis 112, a body 114, four wheels 116, an electronic control system 118, a steering system 150, a braking system 160, and a control system 170. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

In the exemplary embodiment illustrated in FIG. 1, the vehicle 100 has an internal combustion engine 130, and includes an actuator assembly 120. The actuator assembly 120 includes at least one propulsion system 129 mounted on the chassis 112 that drives the wheels 116. The propulsion system 129 comprises a drive system that propels the vehicle 100. In the depicted embodiment, the actuator assembly 120 includes an internal combustion engine 130. Still referring to FIG. 1, the combustion engine 130 is integrated such that the engine 130 is mechanically coupled to at least some of the wheels 116 through one or more drive shafts 134. As depicted in FIG. 1, the vehicle 100 may also include a radiator 128 for cooling the engine 130.

The steering system 150 is mounted on the chassis 112 or body 114, and controls steering of the wheels 116. The steering system 150 is comprised of an Electric Power Steering (EPS) module. A more detailed depiction of the steering system 150 is provided in FIG. 2 and discussed further below in connection therewith, in accordance with an exemplary embodiment.

The braking system 160 is mounted on the chassis 112, and provides braking for the vehicle 100. The braking system 160 receives inputs from the driver via a brake pedal (not depicted), and provides appropriate braking via brake units (also not depicted). In addition, as mentioned below, in certain embodiments steering compensation is disabled or modified when the braking system 160 is engaged by the driver of the vehicle 100.

The control system 170 is coupled to the steering system 150, and controls operation thereof. The control system 170 may also be coupled to various other vehicle devices and systems, such as, among others, the actuator assembly 120, the braking system 160, and the electronic control system 118. A more detailed depiction of the control system 170 is provided in FIG. 2 and discussed further below in connection therewith, in accordance with an exemplary embodiment.

Figure 2:
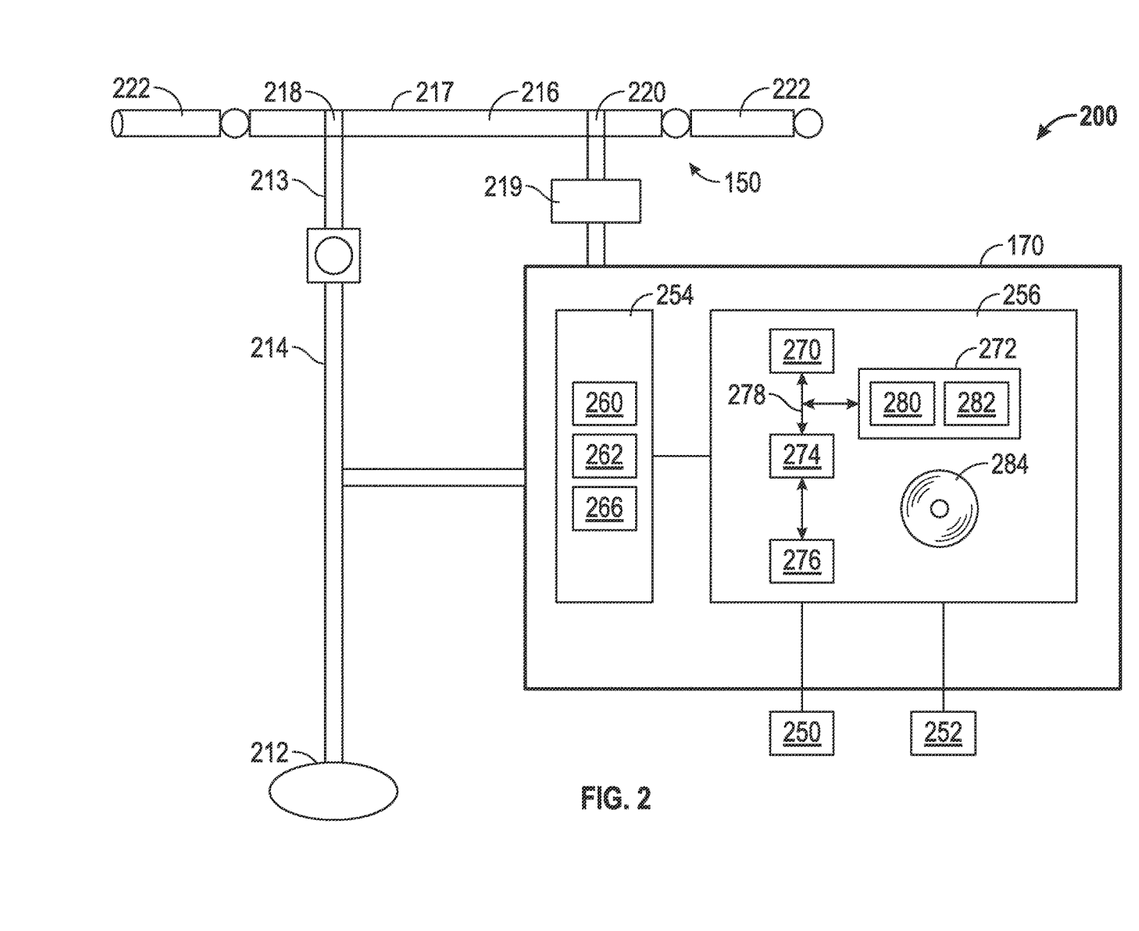
FIG. 2 is a functional block diagram of the electric power steering system and the control system of FIG. 1, in accordance with an exemplary embodiment.

FIG. 2 is a schematic drawing of a system 200 for providing and controlling functionality for an Electric Power Steering (EPS) system for a vehicle, such as the vehicle 100 of FIG. 1, in accordance with an exemplary embodiment. As depicted in FIG. 2, the system 200 includes the steering system 150 of FIG. 1 and the control system 170 of FIG. 1, in accordance with an exemplary embodiment. The system 200 provides for control of the steering functionality using, among other factors, differentiation between straight-line driving and vehicle turns, including vehicle turns with relatively long radii (such as a freeway ramp). The system 200 preferably performs such functions using the steps of the process 300 depicted in FIG. 3 and described further below in connection therewith.

The vehicle steering system 150 includes a steering wheel 212, a steering column assembly 214, a rack 216 having a rack housing 217, a control pinion 218, an electric motor 219, an assist pinion 220, one or more tie rods 222, and an intermediate shaft 213. The steering column assembly 214 is coupled to the steering wheel 212, and is rotationally movable thereby. The steering column assembly 214 is configured to at least facilitate movement of wheels of the vehicle based at least in part on movement of the steering wheel 212. Specifically, operation of the steering wheel 212 causes rotational movement of the steering column assembly 214 and intermediate shaft 213, which in turn causes translational movement of the rack 216 and tie rods 222 via the control pinion 218 and the assist pinion 220, and thereby ultimately causing rotation of the wheels of the vehicle. While the embodiment of the vehicle steering system 150 of FIG. 1 comprises a dual pinion (DP) electrically powered steering system, in certain other embodiments other types of steering systems may be used, such as a column type electric power steering system (CEPS) or a belt drive (BD) electrically powered steering system.

The control system 170 is coupled to the steering system 150, and controls operation thereof. The control system 170 (preferably, the processor 270 thereof, described further below) provides instructions to the motor 219 to provide, under appropriate conditions, compensating torque against the rack 216 (to thereby balance any unwanted torque caused by environmental conditions such as wind gusts or crowns in the roadway, or by vehicle conditions such as a vehicle alignment and tire effects). In certain embodiments, the motor 219 may provide compensating torque against the steering column assembly 214 and/or the steering wheel 212.

The control system 170 provides for control of the steering functionality of the steering system 150 using, among other factors, differentiation between straight-line driving and vehicle turns, including vehicle turns with relatively long radii (such as a freeway ramp). The control system 170 preferably performs such functions using the steps of the process 300 depicted in FIG. 3 and described further below in connection therewith.

As depicted in FIG. 2, the control system 170 uses signals from at least one of a compass 250, a global positioning system (GPS) device 252, a sensor array 254, and a controller 256. The compass 250 measures values as to a heading of the vehicle at various points in time and provides such compass heading values for the controller 256 for processing. The GPS device 252 receives values as to a heading of the vehicle (preferably using a non-depicted GPS satellite system) and provides such GPS heading values for the controller 256 for processing.

The sensor array 254 is coupled to the controller 256. The sensor array 254 includes one or more torque sensors 260, yaw rate sensors 262, and wheel sensors 266.

The torque sensor 260 measures a torque applied by a driver of the vehicle to the steering wheel 212 and/or the steering column assembly 214. In one embodiment, the torque sensor 260 is coupled to the steering wheel 212, and measures a torque applied by the driver against the steering wheel 212. In another embodiment, the torque sensor 260 is coupled to the steering column assembly 214, and measures a torque applied to the steering torque assembly 214 resulting from the driver's application of the steering wheel 212. It is noted that, in certain embodiments, the torque sensor 260 can be disposed in the steering column (for example, for a CEPS steering system) and/or in the input shaft (for example, for a DP or BD steering system). The torque sensor 260 provides the torque values to the controller 256 for processing, including the determination of an amount of compensating torque that may be required.

The yaw rate sensor 262 measures a yaw velocity of the vehicle. The yaw rate sensor 262 provides the yaw velocity values to the controller 256 for processing, including the determination of whether the vehicle is travelling on a straight line path.

The wheel sensors 266 measure a tire angular velocity. The wheel sensors 266 provide the wheel angular velocity values to the controller 256 for processing, including for determining whether the vehicle is travelling on a straight line path.

The controller 256 is coupled to the compass 250, the GPS device 252, the sensor array 254, and the steering system 150. The controller 256 controls various aspects of the steering system 150, including activation and de-activation of the compensation torque of the steering functionality, based on the values and information obtained from at least one of the compass 250, the GPS device 252, and the sensor array 254. These features are preferably performed by the controller 256, along with the compass 250, the GPS device 252, the sensor array 254, and the steering system 150 in accordance with the steps of the process 300 depicted in FIG. 3 and described further below in connection therewith.

Figure 3:
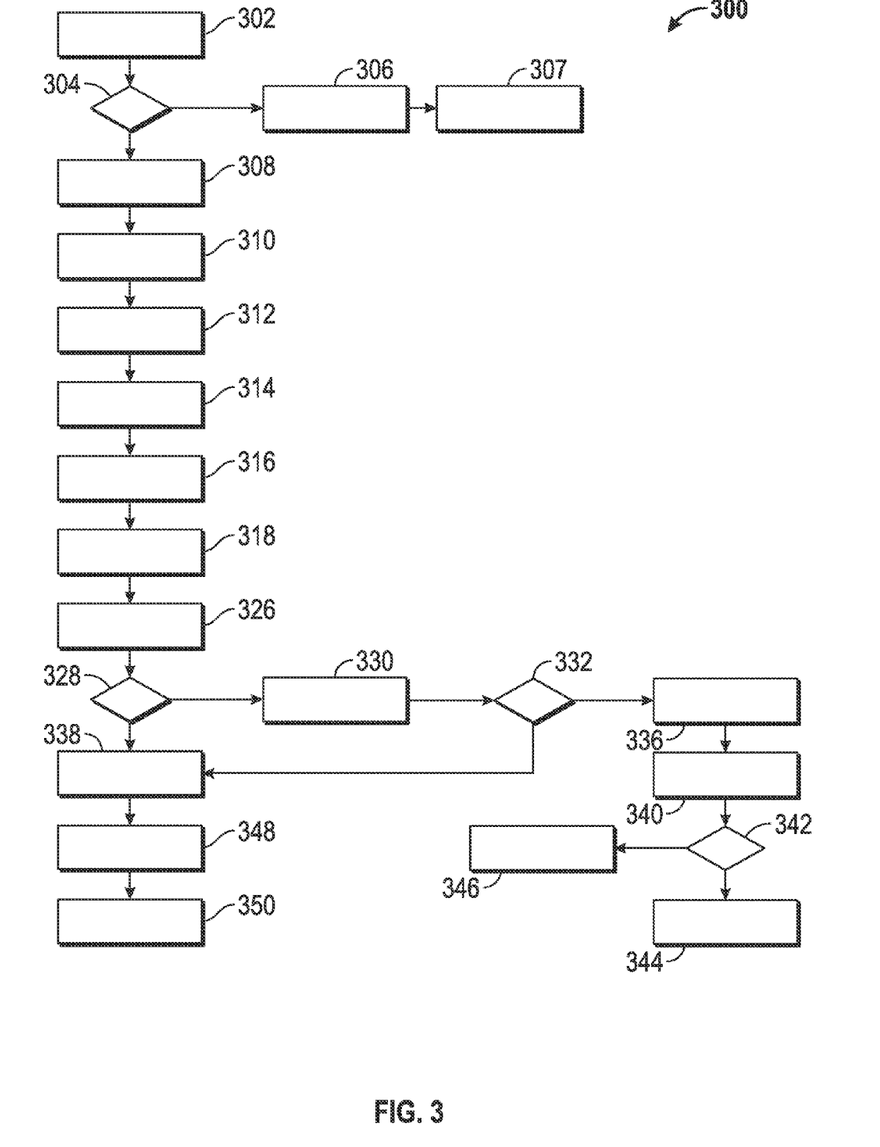
FIG. 3 is a flowchart of a process for controlling a steering system, and that can be used in conjunction with the vehicle of FIG. 1 and the Electric Power Steering and the control system of FIG. 2, in accordance with an exemplary embodiment.

The controller 256 also may be in operative communication with an engine control unit of the vehicle corresponding to the vehicle steering system 150 via a communications bus (for example, a CAN bus), in order to receive some of the above-referenced values, and/or additional data (such as vehicle parameters that may include, among others, vehicle speed, engine Revolutions Per Minute (RPM), and the like), for example in performing various steps of the process 300 of FIG. 3.

As depicted in FIG. 2, the controller 256 comprises a computer system that includes a processor 270, a memory 272, an interface 274, a storage device 276, and a bus 278. The processor 270 performs the computation and control functions of the computer system and the controller 256, and may comprise any type of processor or multiple processors, single integrated circuits such as a microprocessor, or any suitable number of integrated circuit devices and/or circuit boards working in cooperation to accomplish the functions of a processing unit. During operation, the processor 270 executes one or more programs 280 contained within the memory 272 and, as such, controls the general operation of the controller 256 and the computer system, preferably in executing the steps of the processes described herein, such as the process 300 depicted in FIG. 3 and described further below in connection therewith. In the depicted embodiment, the controller 256 is the computer system. However, in some embodiments the controller 256 may include one or more items in addition to the computer system.

The memory 272 can be any type of suitable memory. This would include the various types of dynamic random access memory (DRAM) such as SDRAM, the various types of static RAM (SRAM), and the various types of non-volatile memory (PROM, EPROM, and flash). The bus 278 serves to transmit programs, data, status and other information or signals between the various components of the computer system. In a preferred embodiment, the memory 272 stores the above-referenced program 280 along with one or more stored values 282 for use in controlling the vehicle steering system 150 and the components and subsystems thereof (including the on-center functionality with torque compensation) in accordance with steps of the process 300 depicted in FIG. 3 and described further below in connection therewith. In certain examples, the memory 272 is located on and/or co-located on the same computer chip as the processor 270.

The interface 274 allows communication to the computer system, for example from a system driver and/or another computer system, and can be implemented using any suitable method and apparatus. It can include one or more network interfaces to communicate with other systems or components. The interface 274 may also include one or more network interfaces to communicate with technicians, and/or one or more storage interfaces to connect to storage apparatuses, such as the storage device 276.

The storage device 276 can be any suitable type of storage apparatus, including direct access storage devices such as hard disk drives, flash systems, floppy disk drives and optical disk drives. In one exemplary embodiment, the storage device 276 comprises a program product from which memory 272 can receive a program 280 that executes one or more embodiments of one or more processes of the present disclosure, such as the process 300 of FIG. 3 or portions thereof. In another exemplary embodiment, the program product may be directly stored in and/or otherwise accessed by the memory 272 and/or a disk (e.g. disk 284), such as that referenced below.

The bus 278 can be any suitable physical or logical means of connecting computer systems and components. This includes, but is not limited to, direct hard-wired connections, fiber optics, infrared and wireless bus technologies. During operation, the program 280 is stored in the memory 272 and executed by the processor 270.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 270) to perform and execute the program. Such a program product may take a variety of forms, and that the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system may also otherwise differ from the embodiment depicted in FIG. 2, for example in that the computer system may be coupled to or may otherwise utilize one or more remote computer systems and/or other control systems.

FIG. 3 is a flowchart of a process 300 for implementation of the supplemental controls of the steering system for a vehicle, in accordance with an exemplary embodiment. The process 300 can be utilized in connection with the vehicle 100 of FIG. 1 and the steering system 150 and control system 170 of FIGS. 1 and 2, in accordance with an exemplary embodiment.

As depicted in FIG. 3, the process 300 begins with the step of measuring a torque applied by the driver against the steering system 150 of FIGS. 1 and 2 (step 302). In one embodiment, the torque is measured by a torque sensor 260 of FIG. 2 as a measure of the torque applied by the driver against the steering wheel 212 of FIG. 2. In another embodiment, the torque is measured by a torque sensor 260 of FIG. 2 as a measure of the torque against the steering column assembly 214 of FIG. 2 as a result of the driver's engagement of the steering wheel 212. Torque values are preferably measured at various points in time, most preferably continuously, throughout the process 300.

A determination is made as to whether a relatively long-term torque compensation is required (step 304). The determination of step 304 is made based on the torque of various iterations of step 302 over time. Specifically, if the amount of torque applied to the steering wheel is greater than a predetermined torque threshold for at least a predetermined amount of time, then a relatively long-term torque compensation would be required for the functionality of the steering system (for example to correct for an alignment or tire issue with the vehicle). The long-term torque compensation of step 304 is preferably performed across multiple ignition cycles.

If it is determined in step 304 that long-term torque compensation is required, then a long-term compensating torque is calculated (step 306). The compensating torque comprises an amount of torque required to counteract any alignment or other issues with the vehicle that require sustained driver effort on a straight line roadway. The compensating torque is preferably calculated by the processor 270 of FIG. 2 using an integral control action.

The compensating torque is then provided to the steering system (step 307). Specifically, during step 307, compensating torque is provided to the steering system in the amount calculated in step 306. Preferably, the compensating torque is provided based on instructions provided by the processor 270 of FIG. 2 to the motor 219 of FIG. 2 to provide compensating torque against the rack 216 of FIG. 2. In certain embodiments, the compensating torque may be provided based on instructions provided by the processor 270 of FIG. 2 to the motor 219 of FIG. 2 to provide compensating torque against the steering column assembly 214 and/or the steering wheel 212 of FIG. 2. The process then proceeds to step 310, described further below.

Conversely, if it is determined in step 304 that long-term torque compensation is not required, then no long-term torque compensation is provided (step 308). The sub-process of steps 304-308 are preferably performed at various points in time, most preferably continuously, throughout the process 300.

During step 310, a compass heading is measured. The compass heading is preferably measured by the compass 250 of FIG. 2, and the compass heading values are provided to the processor 270 of FIG. 2 for processing. Compass heading values are preferably measured at various points in time, most preferably continuously, throughout the process 300.

A change in the compass heading value is calculated (step 312). The change in compass heading values is preferably calculated by the processor 270 of FIG. 2 based on compass heading values from different iterations of step 310 during a current ignition cycle. In one exemplary embodiment, a threshold of approximately two degrees heading change may be utilized for certain vehicles. However, this may vary in different embodiments, and the applicable thresholds may be different for each vehicle. The change in compass heading is preferably calculated at various points in time, most preferably continuously, throughout the process 300.

A GPS heading is also obtained (step 314). The GPS heading is preferably received or determined by the GPS device 252 of FIG. 2, and the GPS heading values are provided to the processor 270 of FIG. 2 for processing. GPS heading values are preferably measured at various points in time, most preferably continuously, throughout the process 300.

A change in GPS heading values is calculated (step 316). The change in GPS heading values is preferably calculated by the processor 270 of FIG. 2 based on GPS heading values from different iterations of step 316 during a current ignition cycle. In one exemplary embodiment, a threshold of approximately two degrees heading change may be utilized for certain vehicles. However, this may vary in different embodiments, and the applicable thresholds may be different for each vehicle. The change in GPS heading is preferably calculated at various points in time, most preferably continuously, throughout the process 300.

A yaw velocity of the vehicle is also measured (step 318). The yaw velocity is preferably measured by the yaw sensor 262 of FIG. 2, and the yaw velocity values are provided to the processor 270 of FIG. 2 for processing. Yaw velocity values are preferably measured at various points in time, most preferably continuously, throughout the process 300.

A tire angular velocity is measured (step 326). The tire angular velocity is preferably measured by the wheel speed sensors 266 of FIG. 2, and the tire angular velocity values are provided to the processor 270 of FIG. 2 for processing. Tire angular velocity values are preferably measured at various points in time, most preferably continuously, throughout the process 300. Also as part of step 326, a difference is calculated as to the tire angular velocities of tires that are side-by-side one another on the vehicle.

A determination is made as to whether the vehicle is travelling on a straight line path (or roadway) (step 328). Step 328 preferably comprises a determination as to whether the vehicle is driving on a relatively straight roadway, as compared with a relatively short radius turn (such as at a traffic light) or a relatively long radius turn (such as at a freeway ramp). The determination of step 328 is preferably made by the processor 270 of FIG. 2 based on one or more of the values of steps 310-326.

In one embodiment of step 328, the vehicle is determined to be travelling on a straight-line path if the change in compass heading of step 312 is less than a predetermined threshold. In one such exemplary embodiment, a threshold of approximately two degrees heading change may be utilized for certain vehicles. However, this may vary in different embodiments, and the applicable thresholds may be different for each vehicle.

In another embodiment of step 328, the vehicle is determined to be travelling on a straight-line path if the change in GPS heading of step 316 is less than a predetermined threshold. In one such exemplary embodiment, a threshold of approximately two degrees heading change may be utilized for certain vehicles. However, this may vary in different embodiments, and the applicable thresholds may be different for each vehicle.

In another embodiment of step 328, the vehicle is determined to be travelling on a straight-line path if the yaw velocity of step 318 is less than a predetermined threshold. In one such exemplary embodiment, a threshold of approximately one half degrees per second (0.5 deg/sec) may be utilized for certain vehicles. However, this may vary in different embodiments, and the applicable thresholds may be different for each vehicle.

In another embodiment of step 328, the vehicle is determined to be travelling on a straight-line path if a difference in tire angular velocities of step 326 (namely, of wheels that are side-to-side of one another) is less than a predetermined threshold. In one such exemplary embodiment, a threshold of approximately one tenth of one percent (0.1%) may be utilized for certain vehicles. However, this may vary in different embodiments, and the applicable thresholds may be different for each vehicle. In one embodiment, the difference of the angular velocities must be below the percentage of the angular velocity of either tire for the determination to be made that the vehicle is travelling on a straight-line path.

If it is determined in step 328 that the vehicle is travelling on a straight line path, then a velocity of the vehicle is calculated (step 330). In one embodiment, the vehicle velocity is calculated by the processor 270 of FIG. 2 based on a wheel speed of the vehicle as measured by the wheel speed sensors 266 of FIG. 2. In certain embodiments, the vehicle velocity may be received by the processor 270 as a signal communicated along a communication link (e.g. a CAN bus) and/or may be calculated by processor 270 from data received along such a communication link (such as, by way of example, transmission output speed sensor data).

A determination is made as to whether the vehicle velocity of step 330 is greater than a predetermined threshold (step 332). In one such exemplary embodiment, a threshold of approximately thirty miles per hour (30 mph) may be utilized for certain vehicles. However, this may vary in different embodiments, and the applicable thresholds may be different for each vehicle. This determination is preferably made by the processor 270 of FIG. 2.

If the conditions of steps 328 and 332 are both satisfied (namely, that the vehicle velocity is travelling along a straight line path as determined in step 328 and that the vehicle velocity is greater than the threshold of step 332), then it is determined that a passive or learning compensatory state exists (step 336). Other conditions may also be considered for determination of this valid compensatory state, such as vehicle acceleration (braking or driving) and can likewise be included as additional criteria for determination of state. This determination is preferably made by the processor 270 of FIG. 2.

Conversely, if at least one of the conditions of steps 328 or 332 are not satisfied (namely, that the vehicle is not travelling on a straight line path or roadway, as determined in step 328, or that the velocity is less than or equal to the threshold of step 332), then it is determined that compensatory state conditions do not presently exist (step 338). This determination is also preferably made by the processor 270 of FIG. 2.

If it is determined in step 336 that compensatory state conditions exist, then learning is provided for the long-term torque compensation for the compensated steering functionality (step 340). Specifically, the torque values of step 302 during time periods corresponding to the compensatory state conditions of step 336 are stored in the memory 272 of FIG. 2 as stored values 282 therein for use in updating that amount of relatively long-torque compensation calculated in step 306, preferably based on an integral or equivalent control action. This learning provides adjustment or updating of the relatively long-term torque compensating values of step 306 to include current, compensatory state conditions in addition to the previous compensatory state conditions that would have already been reflected in step 306. In one embodiment, the learning/adjustment of step 340 is performed across multiple ignition cycles for the vehicle. The learning/adjustment of step 340 is preferably performed by the processor 270 of FIG. 2, and resulting updated values are preferably stored in the memory 280 of FIG. 2 as stored values 282 therein.

In addition, a determination is made as to whether short term torque compensation is required (step 342). Short-term compensation may be required if a short term disturbance may result in a lead/pull condition of the vehicle. A lead/pull condition refers to a condition of the vehicle wherein the vehicle regularly leads or pulls in a direction that is not intended by the driver. For example, a lead/pull condition would require the driver to apply torque even if the vehicle were travelling along a straight line path. Short-term compensation may be required, for example, due to wind gusts or slopes in the road (for example, in banks or crowns in the road). The determination of whether short term compensation required is similar to the determination of step 304, except that the determination applies within a shorter time frame (and within a current ignition cycle). Specifically, if the amount of torque applied to the steering wheel is greater than a predetermined torque threshold for at least a predetermined amount of time (namely, a relatively shorter amount of time as compared with the determination of step 304) within a current ignition cycle, then a relatively short-term torque compensation would be required for the functionality of the steering system (for example to adjust for wind gusts, road banks, and/or other temporary conditions). In one embodiment, this determination is made by the processor 270 of FIG. 2 using the level of torque applied to the steering wheel 212 of FIG. 2 (for example, measured by the torque sensors 260 of FIG. 2).

If it is determined that short term torque compensation is required, then short-term torque compensation is provided (step 344). Specifically, during step 344, compensating torque is provided for the steering system in an amount that is calculated to offset the short-term disturbance (for example, the wind gust or the bank or the crown in the road). In certain embodiments, the short-term torque compensation is disabled if the braking system 160 of FIG. 1 is engaged by the driver of the vehicle 100. Preferably, the compensating torque is provided based on instructions provided by the processor 270 of FIG. 2 to the motor 219 of FIG. 2 to provide compensating torque against the rack 216 of FIG. 2. In certain embodiments, the compensating torque may be provided based on instructions provided by the processor 270 of FIG. 2 to the motor 219 of FIG. 2 to provide compensating torque against the steering column assembly 214 or the steering wheel 212 of FIG. 2. Conversely, if it is determined in step 342 that short term compensation is not required, then no short-term torque compensation is provided (step 346).

Returning to step 338, if it is determined that the vehicle is not in a compensatory state condition for the compensating steering functionality, then no learning or adjustment of the long term torque compensation of step 306 is provided (specifically, step 340 is not performed) (step 348). In addition, no short-term compensating torque is provided (specifically, step 344 is not performed) (step 350). Accordingly, in one embodiment, the long term torque compensation learning of step 340 and the providing of short-term torque compensation of step 344 are not provided when it is determined in step 328 that the vehicle is not travelling on a straight line path. In one such embodiment, torque compensation is completely terminated by the processor when the vehicle is not travelling on a straight line path. In another embodiment, when the vehicle is not travelling on a straight line path, a level of lead/pull compensation torque may be maintained by the processor based on previous learning (i.e. from before the current condition in which the vehicle is not traveling along a straight line path). In addition, the long term torque compensation of step 340 and the providing of short-term torque compensation of step 344 are also not provided if the vehicle velocity is less than or equal to the threshold of step 332.

Thus, certain features of the compensation functionality (namely, the long term torque compensation learning and the providing of the short term torque compensation) are disabled when the vehicle is not travelling on a straight line path. This allows for potentially more accurate and desirable results, for example because a vehicle turn (including a relatively large-radius turn, such as for a freeway ramp) will not be interpreted as requiring torque compensation (because the torque is desired by the driver to execute the turn, and is not due to an alignment issue, a wind gust, a road bank or crown, and/or some other issue requiring compensation). In contrast, previous techniques may not have been able to distinguish such turns (particularly, such relatively large-radius turns) from straight line vehicle operation. The sub-processes of steps 328-350 are preferably performed at various points in time, most preferably continuously, throughout the process 300.

It will be appreciated that the disclosed methods and systems may vary from those depicted in the Figures and described herein. For example, as mentioned above, the vehicle 100 of FIG. 1, the steering system 150 and the computer system 170 of FIGS. 1 and 2, and/or portions and/or components thereof may vary, and/or may be disposed in whole or in part in any one or more of a number of different vehicle units, devices, and/or systems, in certain embodiments. In addition, it will be appreciated that certain steps of the process 300 may vary from those depicted in FIG. 3 and/or described above in connection therewith. It will similarly be appreciated that certain steps of the process 300 may occur simultaneously or in a different order than that depicted in FIG. 3 and/or described above in connection therewith.

Accordingly, methods and systems are provided for controlling steering systems for vehicles. The disclosed methods and systems provide for potentially improved use of steering systems, for example by differentiating between straight-line travel as compared with vehicle turns, including relatively large-radius turns such as freeway ramps. In certain embodiments, the application of a short-term offset torque (for example, in the case of a wind gust or a crown in the road) may be disabled when the vehicle is in a turn, and/or long-term learning of an offset torque (for example, to compensate for alignment imbalances and/or other vehicle issues) may be disabled when the vehicle is in a turn.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of controlling a steering system of a vehicle, the method comprising:
   obtaining a heading for the vehicle via a detection unit comprising a source for heading information for the vehicle;
   generating sensor data for the vehicle via a sensor array;
   determining a velocity of the vehicle using the sensor data;
   determining whether the vehicle is on a straight line path, via a processor, based on the heading; and
     selectively implementing a lead/pull feature of the steering system, via the processor, based on the velocity of the vehicle and whether it is determined that the vehicle is on a straight line path, by:
       activating the lead/pull feature of the steering system if it is determined that the vehicle is on a straight line path and the velocity of the vehicle is greater than a non-zero predetermined threshold; and
       disabling the lead/pull feature of the steering system if it is determined that the vehicle is not on a straight line path, or the velocity of the vehicle is less than or equal to the non-zero predetermined threshold, or both.

2. The method of claim 1 further comprising:
   providing learning for long term compensation of steering torque when the vehicle is on a straight line path and the velocity of the vehicle is greater than the non-zero predetermined threshold; and
   not providing learning for the long term compensation of the compensating steering torque when the vehicle is not on a straight line path, or the velocity of the vehicle is less than or equal to the non-zero predetermined threshold, or both;
   such that the learning for the long term compensation of the steering torque is based on conditions when the vehicle is on a straight line path and the velocity is greater than the non-zero predetermined threshold, but is not based on conditions when the vehicle is not on a straight line path, or the velocity of the vehicle is less than or equal to the non-zero predetermined threshold, or both.

3. The method of claim 1, wherein the step of determining whether the vehicle is on a straight line path comprises determining whether the vehicle is not making a turn.

4. The method of claim 1, wherein the step of disabling the feature of the steering system comprises:
   maintaining a level of lead/pull compensation torque based on previous learning when the vehicle is not on a straight line path.

5. The method of claim 1, wherein the step of determining whether the vehicle is on a straight path comprises:
   determining whether the vehicle is on a straight line path based on the compass heading.

6. The method of claim 5, wherein the step of determining whether the vehicle is on a straight line path comprises:
   obtaining a first compass heading value at a first time;
   obtaining a second compass heading value at a second time; and
   determining that the vehicle is on a straight line path if a difference between the first and second compass heading values is less than a predetermined threshold.

7. The method of claim 1, wherein the step of determining whether the vehicle is on a straight path comprises:
   determining whether the vehicle is on a straight line path based on a global positioning system (GPS) heading.

8. The method of claim 7, wherein the step of determining whether the vehicle is on a straight line path comprises:
   obtaining a first GPS heading value at a first time;
   obtaining a second GPS heading value at a second time; and
   determining that the vehicle is on a straight line path if a difference between the first and second GPS heading values is less than a predetermined threshold.

9. A system for controlling the steering system of a vehicle, the system comprising:
   a detection unit comprising a source for heading information for the vehicle, the source for heading information configured to obtain a heading for the vehicle; and
   a sensor array configured to generate sensor data for the vehicle;
   a processor coupled to the detection unit and configured to:

determine a velocity of the vehicle using the sensor data;

determine whether the vehicle is on a straight line path using the heading; and selectively implement a lead/pull feature of the steering system based on the velocity of the vehicle and whether it is determined that the vehicle is on a straight line path, by:

activating the lead/pull feature of the steering system if it is determined that the vehicle is on a straight line path and the velocity of the vehicle is greater than a non-zero predetermined threshold; and disabling the lead/pull feature of the steering system if it is determined that the vehicle is not on a straight line path, or the velocity of the vehicle is less than or equal to the non-zero predetermined threshold, or both.

10. The system of claim 9, wherein the processor is configured to:

provide learning for long term compensation of steering torque when the vehicle is on a straight line path and the velocity of the vehicle is greater than the non-zero predetermined threshold; and not providing learning for the long term compensation of the steering torque when the vehicle is not on a straight line path, or the velocity of the vehicle is less than or equal to the non-zero predetermined threshold, or both;

such that the learning for the long term compensation of the steering torque is based on conditions when the vehicle is on a straight line path and the velocity is greater than the non-zero predetermined threshold, but is not based on conditions when the vehicle is not on a straight line path, or the velocity of the vehicle is less than or equal to the non-zero predetermined threshold, or both.

11. The system of claim 9, wherein:

the detection unit comprises a sensor configured to measure a torque provided by a driver of the vehicle to a steering column of the vehicle; and the processor is configured to:

use the torque for calculating a compensating steering torque when the vehicle is on a straight line path; and not use the torque for calculating the compensating steering torque when the vehicle is not on a straight line path.

12. The system of claim 9, wherein:

the detection unit comprises a compass configured to provide:

a first compass heading value at a first time; and a second compass heading value at a second time; and the processor is configured to determine that the vehicle is on a straight line path if a difference between the first and second compass heading values is less than a predetermined threshold.

13. The system of claim 9, wherein:

the detection unit comprises a GPS system component configured to provide:

a first GPS heading value at a first time; and a second GPS heading value at a second time; and the processor is configured to determine that the vehicle is on a straight line path if a difference between the first and second GPS heading values is less than a predetermined threshold.

14. The system of claim 10, further comprising:

a sensor configured to measure a torque applied by the driver against the steering system when the vehicle is on a straight line path and the velocity of the vehicle is greater than the non-zero predetermined threshold; and a memory configured to store, for use in future driving cycles, the measured torque applied by the driver against the steering system when, and only when, the vehicle is on a straight line path and the velocity of the vehicle is greater than the non-zero predetermined threshold, based on the vehicle being on the straight line path and the velocity of the vehicle being greater than the non-zero predetermined threshold;

wherein the processor is configured to:

perform the learning for the long term compensation of the steering torque based on the measured torque applied by the driver against the steering system when, and only when, the vehicle is on a straight line path and the velocity of the vehicle is greater than the non-zero predetermined threshold; and provide instructions for providing compensation of the steering torque, based on the stored measured torque values, for use by the vehicle in subsequent driving cycles in which the vehicle is on a straight line path and the velocity of the vehicle is greater than the non-zero predetermined threshold.

15. The system of claim 9, wherein the non-zero predetermined threshold is equal to approximately thirty miles per hour.

16. The system of claim 9, wherein the non-zero predetermined threshold is equal to thirty miles per hour.

17. The system of claim 9, wherein then processor is configured to:

determine whether the vehicle is on a straight line path using the heading for at least a first non-zero predetermined amount of time;

determine whether the vehicle is on a straight line path using the heading for at least a second non-zero predetermined amount of time, the second non-zero amount of time being greater than the first non-zero amount of time;

determine whether the velocity of the vehicle is less than or equal to the non-zero predetermined threshold for at least the first non-zero predetermined amount of time;

determine whether the velocity of the vehicle is less than or equal to the non-zero predetermined threshold for at least the second non-zero predetermined amount of time;

activate short term compensation for the lead/pull feature of the steering system if it is determined that the vehicle is on a straight line path and the velocity of the vehicle is greater than the non-zero predetermined threshold for at least the first predetermined amount of time;

disable short term compensation for the lead/pull feature of the steering system if it is determined that the vehicle is not on a straight line path, or the velocity of the vehicle is less than or equal to the non-zero predetermined threshold, or both, for at least the first predetermined amount of time;

activate long term learning for the lead/pull feature of the steering system, for learning between different vehicle ignition cycles, if it is determined that the vehicle is on a straight line path and the velocity of the vehicle is greater than the non-zero predetermined threshold for at least the second predetermined amount of time; and disable long term learning for the lead/pull feature of the steering system, between different ignition cycles, if it is determined that the vehicle is not on a straight line path, or the velocity of the vehicle is less than or equal to the non-zero predetermined threshold, or both, for at least the second predetermined amount of time.

18. The system of claim 9, wherein the processor is configured to:
provide instructions for providing a first level of lead/pull compensation when the vehicle is on a straight line path and the velocity of the vehicle is greater than a non-zero predetermined threshold; and
provide instructions for maintaining a second level of lead/pull compensation torque, different from the first level, when the vehicle is not on the straight line path, the velocity of the vehicle is greater than the non-zero predetermined threshold, or both.

19. The system of claim 18, wherein the processor is configured to:
provide instructions for providing the first level of lead/pull compensation based on current conditions when the vehicle is on a straight line path and the velocity of the vehicle is greater than a non-zero predetermined threshold; and
provide instructions for maintaining the second level of lead/pull compensation torque, based on previous learning from prior to the current conditions, when the vehicle is not on the straight line path, the velocity of the vehicle is greater than the non-zero predetermined threshold, or both.

20. The system of claim 10, wherein the processor is configured to:
provide the learning, across multiple ignition cycles, for the long term compensation of steering torque when the vehicle is on a straight line path and the velocity of the vehicle is greater than the non-zero predetermined threshold; and
not provide learning, across multiple ignition cycles, for the long term compensation of the steering torque when the vehicle is not on a straight line path, or the velocity of the vehicle is less than or equal to the non-zero predetermined threshold, or both;
such that the learning, across multiple ignition cycles, for the long term compensation of the steering torque is based on conditions when the vehicle is on a straight line path and the velocity is greater than the non-zero predetermined threshold, but is not based on conditions when the vehicle is not on a straight line path, or the velocity of the vehicle is less than or equal to the non-zero predetermined threshold, or both.

* * * * *